US012756476B2

(12) United States Patent
Masuyama

(10) Patent No.: US 12,756,476 B2
(45) Date of Patent: Oct. 6, 2026

(54) OPTICAL TRANSMITTER INCLUDING SPLITTING ELEMENTS, EXTERNAL MODULATORS, AND WAVELENGTH MULTIPLEXERS, AND OPTICAL TRANSCEIVER INCLUDING POLARIZATION SEPARATION ELEMENTS, WAVELENGTH DEMULTIPLEXERS, POLARIZATION ROTATION ELEMENTS, AND PHOTODETECTORS

(71) Applicant: Mitsubishi Electric Corporation, Tokyo (JP)

(72) Inventor: Kei Masuyama, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 247 days.

(21) Appl. No.: 18/605,072

(22) Filed: Mar. 14, 2024

(65) Prior Publication Data

US 2024/0223282 A1 Jul. 4, 2024

Related U.S. Application Data

(63) Continuation of application No. PCT/JP2021/044062, filed on Dec. 1, 2021.

(51) Int. Cl.
*H04B 10/50* (2013.01)
*H04B 10/40* (2013.01)
(Continued)

(52) U.S. Cl.
CPC ........... *H04B 10/506* (2013.01); *H04B 10/40* (2013.01); *H04B 10/67* (2013.01); *H04J 14/02* (2013.01); *H04J 14/06* (2013.01)

(58) Field of Classification Search
CPC ...... H04B 10/506; H04B 10/40; H04B 10/67; H04J 14/02; H04J 14/06
See application file for complete search history.

(56) References Cited

U.S. PATENT DOCUMENTS

2015/0050020 A1* 2/2015 Tanaka ................ H04J 14/0282 398/79
2016/0204878 A1* 7/2016 Goodwill ......... H04B 10/25759 398/115
(Continued)

FOREIGN PATENT DOCUMENTS

JP 2006-309066 A 11/2006
JP 2017-188816 A 10/2017
WO WO 2016/167010 A1 10/2016

OTHER PUBLICATIONS

"3.2 Tb/s Copackaged Optics Optical Module Product Requirements Document", CPO Optical Module Product Requirements Document, Version 1.0, Feb. 5, 2021, total 28 pages.
(Continued)

*Primary Examiner* — Casey L Kretzer
(74) *Attorney, Agent, or Firm* — Birch, Stewart, Kolasch & Birch, LLP

(57) ABSTRACT

An optical transmitter splits each of pieces of continuous wave light with N different wavelengths into M, and includes: a plurality of splitting elements to each split input light into two, N of the plurality of splitting elements to which the pieces of continuous wave light with N different wavelength are input being included in each of splitting blocks arranged at $j=\log_2 M$ stages; N×M external modulators to modulate respective pieces of the continuous wave light obtained by splitting at splitting elements at a j-th stage; and M wavelength multiplexers to multiplex every N different wavelengths of light after being modulated output from the external modulators, and the plurality of splitting
(Continued)

elements are connected in such a manner that arranging order of N wavelengths that are input to an upstream splitting block and arranging order of N wavelengths that are input to each of downstream splitting blocks are identical.

12 Claims, 6 Drawing Sheets

(51) Int. Cl.

| | |
|---|---|
| ***H04B 10/67*** | (2013.01) |
| ***H04J 14/02*** | (2006.01) |
| ***H04J 14/06*** | (2006.01) |

(56) References Cited

U.S. PATENT DOCUMENTS

2017/0307818 A1 10/2017 Hasegawa
2020/0319409 A1* 10/2020 Su ...................... H04J 14/0209

OTHER PUBLICATIONS

International Search Report (PCT/ISA/210) issued in PCT/JP2021/044062, dated Feb. 15, 2022.

* cited by examiner

OPTICAL TRANSMITTER INCLUDING SPLITTING ELEMENTS, EXTERNAL MODULATORS, AND WAVELENGTH MULTIPLEXERS, AND OPTICAL TRANSCEIVER INCLUDING POLARIZATION SEPARATION ELEMENTS, WAVELENGTH DEMULTIPLEXERS, POLARIZATION ROTATION ELEMENTS, AND PHOTODETECTORS

CROSS-REFERENCE TO RELATED APPLICATION

This application is a Continuation of PCT International Application No. PCT/JP2021/044062, filed on Dec. 1, 2021, which is hereby expressly incorporated by reference into the present application.

TECHNICAL FIELD

The present disclosure relates to an optical transmitter and an optical transceiver.

BACKGROUND ART

In the technical field of optical transfer, instead of conventional pluggable transceiver modes, a mode called Co-Packaged Optics (CPO) in which optical transceivers are directly implemented on a substrate around an Application Specific Integrated Circuit (ASIC) switch has been discussed. In optical transmitter configuration having been discussed as an example of CPO, a plurality of high-output continuous wave (CW) laser light sources with different wavelengths are arranged outside a switch box avoiding the space around a highly heat-generative ASIC switch, the CW laser light sources and CPO are connected by optical fibers, each CW laser is split inside CPO, and then a CW laser on each lane is externally modulated. In such configuration, by splitting light from CW laser light sources into light beams on several signal lanes, and externally modulating the light beams after being split with respective different signals, the number of required CW laser light sources is reduced; furthermore, by applying a wavelength division multiplexing (WDM: Wavelength Division Multiplexing) technology of bundling light beams with different wavelengths into one fiber, the number of fibers on the output side is reduced (see Non-Patent Literature 1).

CITATION LIST

Non-Patent Literature

Non-Patent Literature 1: CPO Optical Module Product Requirements Documents: JDF-3.2 Tb/s Copackaged Optics Optical Module Product Requirements Documents

SUMMARY OF INVENTION

Technical Problem

By applying the configuration of an optical transmitter on page 8 of Non-Patent Literature 1 to a case where, for example, signals on sixteen lanes are externally modulated by 4-wavelength multiplexing, the configuration of the optical transmitter can be drawn as depicted in FIG. 5. Although, in the configuration in FIG. 5, bundling wavelengths for each fiber requires arranging respective lane signals in wavelength order, and then outputting them to a single fiber by a wavelength multiplexer, this results in the presence of a lane with a large number of waveguide crossings (the lane of Port4BB in FIG. 5) and lanes with small numbers of waveguide crossings (the lanes of Port1AA, Port1AB, Port1BA, Port1BB and Port4AA in FIG. 5). Because waveguide crossings at each stage generate insertion loss and crosstalk, conventional technologies have a problem that there is inter-lane waveguide-loss variation.

The present disclosure has been made to solve such a problem, and an object thereof is to provide an optical transmitter and an optical transceiver that can reduce inter-lane loss variation.

Solution to Problem

An optical transmitter according to an embodiment of the present disclosure is an optical transmitter to split each of pieces of continuous wave light with N different wavelengths into M, where N is an integer equal to or greater than four, and M is an integer which is equal to or greater than two, and is a power of two, the optical transmitter including: a plurality of splitting elements to each split input light into two, N of the plurality of splitting elements to which the pieces of continuous wave light with N different wavelength are input being included in each of splitting blocks arranged at $j=\log_2 M$ stages; N×M external modulators to modulate respective pieces of the continuous wave light obtained by splitting at splitting elements at a j-th stage of the $j=\log_2 M$ stages; and M wavelength multiplexers to multiplex every N different wavelengths of light after being modulated output from the external modulators, in which the plurality of splitting elements are connected in such a manner that arranging order of N wavelengths of N lanes that are input to an upstream splitting block and arranging order of N wavelengths of N lanes that are input to each of downstream splitting blocks are identical.

Advantageous Effects of Invention

An optical transmitter according to embodiments of the present disclosure can reduce inter-lane loss variation.

DESCRIPTION OF EMBODIMENTS

Hereinbelow, various embodiments in the present disclosure are explained in detail with reference to the attached figures. Note that constituent elements in the figures that are given identical or similar reference signs have identical or similar configuration or functions, and overlapping explanations about such constituent elements are omitted.

First Embodiment

<Configuration>

Figure 1:
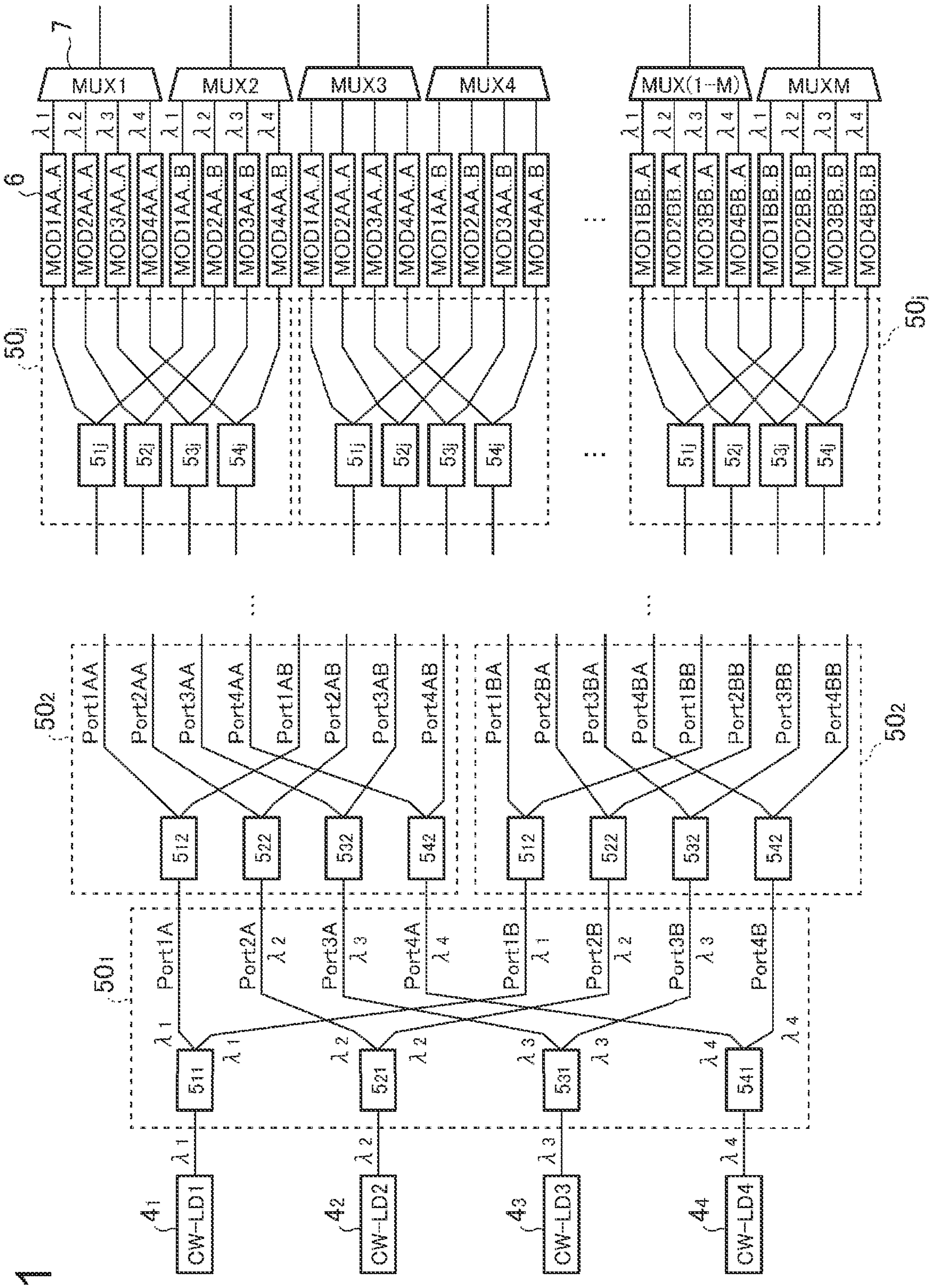
FIG. 1 is a figure depicting a configuration example of an optical transmitter according to a first embodiment.

An optical transmitter according to a first embodiment of the present disclosure is explained with reference to FIG. 1. In brief, as depicted in FIG. 1, the optical transmitter according to the first embodiment is an optical transmitter to split each of pieces of continuous wave light with N different wavelengths into M, the optical transmitter including: a plurality of splitting elements 5 to each split input light into two, N of the plurality of splitting elements to which the pieces of continuous wave light with N different wavelength are input being included in each of splitting blocks 50 arranged at $j=\log_2 M$ stages; N×M external modulators 6 to modulate respective pieces of the continuous wave light obtained by splitting at splitting elements 5 at the j-th stage; and M wavelength multiplexers 7 to multiplex every N different wavelengths of light after being modulated output from the external modulators 6, in which the plurality of splitting elements 5 are connected in such a manner that arranging order of N wavelengths of N lanes that are input to an upstream splitting block 5 and arranging order of N wavelengths of N lanes that are input to each of downstream splitting blocks 5 are identical. Note that although FIG. 1 depicts a case where the number of wavelengths (the number of multiplexed wavelengths) N is four, N may be another integer which is equal to or greater than five. In addition, M is an integer which is equal to or greater than two, and is a power of two. Hereinbelow, a more specific explanation is given.

(Laser Light Source)

For example, laser light sources $\mathbf{4}_1$ to $\mathbf{4}_4$ to perform continuous-wave oscillation (CW oscillation) with N mutually different wavelengths are provided outside or inside the optical transmitter. The laser light source $\mathbf{4}_1$ performs oscillation with a wavelength $\lambda_1$, the laser light source $\mathbf{4}_2$ performs oscillation with a wavelength $\lambda_2$, the laser light source $\mathbf{4}_3$ performs oscillation with a wavelength $\lambda_3$, and the laser light source $\mathbf{4}_4$ performs oscillation with a wavelength $\lambda_4$. The wavelengths $\lambda_1$ to $\lambda_4$ are mutually different wavelengths. As the laser light sources 4, semiconductor lasers adjusted to desired wavelengths by temperature control or the like can be used. Laser light from the laser light sources $\mathbf{4}_1$ to $\mathbf{4}_4$ is input to the optical transmitter via N optical fibers (four optical fibers in the example depicted in FIG. 1). Note that instead of a plurality of laser light sources, each of which performs oscillation with a single wavelength, one or more laser light sources, each of which performs oscillation with many wavelengths, may be used.

(Optical Transmitter)

As depicted in FIG. 1, the optical transmitter includes splitting blocks $\mathbf{50}_1$ to $\mathbf{50}_j$ at $j=\log_2 M$ stages. The number of splitting blocks 50 at an s-th stage is $2^{s-1}$ (s=1, 2, . . . , j). That is, the optical transmitter includes one ($=2^{1-1}$) splitting block $\mathbf{50}_1$ at the first stage, includes two ($=2^{2-1}$) splitting blocks $\mathbf{50}_2$ at the second stage and includes $2^{j-1}$ splitting blocks $\mathbf{50}_j$ at the j-th stage. Each splitting block includes N splitting elements 5, and the splitting elements 5 are optically connected. In addition, the optical transmitter includes the N×M external modulators 6 and the M wavelength multiplexers 7. Splitting elements $\mathbf{5}_{1j}$ to $\mathbf{5}_{4j}$ of the splitting block $\mathbf{50}_j$ and the external modulators 6 are optically connected, and the external modulators 6 and the wavelength multiplexers 7 are optically connected.

(Splitting Elements)

Each block of the splitting blocks 50 includes N splitting elements 5. The splitting block $\mathbf{50}_1$ at the first stage includes splitting elements $\mathbf{5}_{11}$ to $\mathbf{5}_{41}$, the splitting block $\mathbf{50}_2$ at the second stage includes splitting elements $\mathbf{5}_{12}$ to $\mathbf{5}_{42}$, and the splitting block $\mathbf{50}_j$ at the j-th stage includes the splitting elements $\mathbf{5}_{1j}$ to $\mathbf{5}_{4j}$. Each splitting element 5 is a 1×2 splitting element to split an input optical signal into two signals, and as a waveguide-type optical coupler, a multi mode interference optical waveguide (MMI: Multi Mode Interference) or a directional coupler can be used.

The splitting element $\mathbf{5}_{11}$, which is a constituent element of the splitting block $\mathbf{50}_1$ at the first stage, is connected to the laser light source $\mathbf{4}_1$, and splits laser light with the wavelength $\lambda_1$ input from the laser light source $\mathbf{4}_1$ into two. The splitting element $\mathbf{5}_{21}$, which is a constituent element of the splitting block $\mathbf{50}_1$ at the first stage, is connected to the laser light source $\mathbf{4}_2$, and splits laser light with the wavelength $\lambda_2$ input from the laser light source $\mathbf{4}_2$ into two. The splitting element $\mathbf{5}_{31}$, which is a constituent element of the splitting block $\mathbf{50}_1$ at the first stage, is connected to the laser light source $\mathbf{4}_3$, and splits laser light with the wavelength $\lambda_3$ input from the laser light source $\mathbf{4}_3$ into two. The splitting element $\mathbf{5}_{41}$, which is a constituent element of the splitting block $\mathbf{50}_1$ at the first stage, is connected to the laser light source $\mathbf{4}_4$, and splits laser light with the wavelength $\lambda_4$ input from the laser light source $\mathbf{4}_4$ into two. Laser light, each piece of which is one of a pair of pieces of laser light obtained by splitting by a corresponding one of the splitting element $\mathbf{5}_{11}$ to the splitting element $\mathbf{5}_{41}$, is aggregated, arranged in order which is the same as the order of the wavelengths input to the splitting block $\mathbf{50}_1$, and output to a downstream stage. Laser light, each piece of which is the other of the pair also is aggregated, arranged in order which is the same as the order of the wavelengths input to the splitting block $\mathbf{50}_1$, and output to the downstream stage. With such configuration, the splitting block $\mathbf{50}_1$ outputs, to the downstream stage, two sets of signals, each set of which includes N lanes in the order which is the same as the wavelength order before the splitting. That is, waveguides cross in such a manner that the arranging order of waveguides (the arranging order of wavelengths) on the input port side of the splitting block $\mathbf{50}_1$ matches the arranging order of waveguides on the split port side of the splitting block $\mathbf{50}_1$. Crossing loss occurs at waveguide crossing sections where the waveguides cross.

The splitting element $\mathbf{5}_{12}$, which is a constituent element of the splitting block $\mathbf{50}_2$ at the second stage, is connected to the splitting element $\mathbf{5}_{11}$, and splits laser light with the wavelength $\lambda_1$ input from the splitting element $\mathbf{5}_{11}$ into two. The splitting element $\mathbf{5}_{22}$, which is a constituent element of the splitting block $\mathbf{50}_2$ at the second stage, is connected to the splitting element $\mathbf{5}_{21}$, and splits laser light with the wavelength $\lambda_2$ input from the splitting element $\mathbf{5}_{21}$ into two. The splitting element $\mathbf{5}_{32}$, which is a constituent element of the splitting block $\mathbf{50}_2$ at the second stage, is connected to the splitting element $\mathbf{5}_{31}$, and splits laser light with the wavelength $\lambda_3$ input from the splitting element $\mathbf{5}_{31}$ into two. The splitting element $\mathbf{5}_{42}$, which is a constituent element of the splitting block $\mathbf{50}_2$ at the second stage, is connected to the splitting element $\mathbf{5}_{41}$, and splits laser light with the wavelength $\lambda_4$ input from the splitting element $\mathbf{5}_{41}$ into two. With such configuration, the splitting block $\mathbf{50}_2$ outputs, to a downstream stage, two sets of signals, each set of which includes N lanes in the order which is the same as the wavelength order before the splitting.

Similarly, the splitting element $5_{1j}$, which is a constituent element of the splitting block $50_j$ at the j-th stage, is connected to a splitting element $5_{1(j-1)}$, which is not depicted, and splits laser light with the wavelength $\lambda_1$ input from the splitting element $5_{1(j-1)}$ into two. The splitting element $5_{2j}$, which is a constituent element of the splitting block $50_j$ at the j-th stage, is connected to a splitting element $5_{2(j-1)}$, which is not depicted, and splits laser light with the wavelength $\lambda_2$ input from the splitting element $5_{2(j-1)}$ into two. The splitting element $5_{3j}$, which is a constituent element of the splitting block $50_j$ at the j-th stage, is connected to a splitting element $5_{3(j-1)}$, which is not depicted, and splits laser light with the wavelength $\lambda_3$ input from the splitting element $5_{3(j-1)}$ into two. The splitting element $5_{4j}$, which is a constituent element of the splitting block $50_j$ at the j-th stage, is connected to a splitting element $5_{4(j-1)}$, which is not depicted, and splits laser light with the wavelength $\lambda_4$ input from the splitting element $5_{4(j-1)}$ into two. With such configuration, the splitting block $50_j$ outputs, to a downstream stage, two sets of signals, each set of which includes N lanes in the order which is the same as the wavelength order before the splitting. Thereby, signals of N×M lanes in total are output from the splitting block $50_j$ at the j-th stage.

In this manner, the plurality of splitting elements 5 are connected in such a manner that the arranging order of the four wavelengths of four lanes input to an upstream splitting block and the arranging order of the four wavelengths of four lanes input to each downstream splitting block are identical.

(External Modulators)

The optical transmitter includes the N×M external modulators 6 depicted as "MOD1AA . . . A" to "MOD4BB . . . B." Examples of the external modulators 6 include Mach-Zehnder modulators, Electro-Absorption (EA) modulators and ring modulators. Signals of N×M lanes output from the splitting block $50_j$ at the j-th stage are externally modulated by the respective N×M external modulators, on the basis of an electric signal from a switch such as an ASIC switch.

(Wavelength Multiplexers)

The optical transmitter includes the M wavelength multiplexers 7 depicted as "MUX1" to "MUXM." Each wavelength multiplexer 7 multiplexes signals with N wavelengths into one lane. In the example of FIG. 1, signals with four wavelengths are input to each wavelength multiplexer 7, and each wavelength multiplexer 7 bundles the input signals with four wavelengths into one lane, and outputs the bundled signals. As the wavelength multiplexers 7, waveguide-type elements can be used, and, for example, arrayed waveguide diffraction gratings (AWGs), or light-multiplexing elements in each of which a plurality of optical couplers are connected can be used. The multiplexed signals are transmitted to the outside of the optical transmitter via an optical fiber connected to each wavelength multiplexer 7.

All of the splitting elements 5 ($5_{11}$ to $5_{4j}$), the external modulators 6 and the wavelength multiplexer 7 can be formed on a single planar waveguide. The splitting elements 5 ($5_{11}$ to $5_{4j}$), the external modulators 6 and the wavelength multiplexers 7 may be integrated on one Si photonics chip. Alternatively, different types of material may be integrated on a Si photonics chip, and, for example, only the external modulators 6 may be formed of a compound semiconductor. The laser light sources $4_1$ to $4_4$ and the planar waveguide may be optically connected by flip-chip implementation, may be integrated on a single chip or may be connected via fibers.

<Operation>

Next, operation of the optical transmitter according to the first embodiment is explained. First, CW signals with N different wavelengths generated by the N laser light sources 4 enter the splitting block $50_1$ at the first stage. Each CW signal having entered the splitting block $50_1$ at the first stage is split into two, and the CW signals after being split enter the splitting block $50_2$ at the second stage. Similarly, each CW signal is split into two at each splitting block, and CW signals are split to N×M signal lanes at the splitting block $50_j$ at the j-th stage. N×M CW signals are externally modulated by the respective N×M external modulators 6. Every N wavelengths of the N×M externally modulated signals are wavelength-multiplexed by the M wavelength multiplexers, and signals generated thereby are transmitted to the outside from respective M optical fibers.

<Effects>

Next, effects are explained. In a case of configuration like that of the optical transmitter according to the conventional technology depicted in FIG. 5 in which each wavelength is split into 1×M from the beginning, and then every N wavelengths are arranged next to each other, the maximum number of waveguide crossings is expressed by Formula (1).

$$(N-1)*M \tag{1}$$

Figure 5:
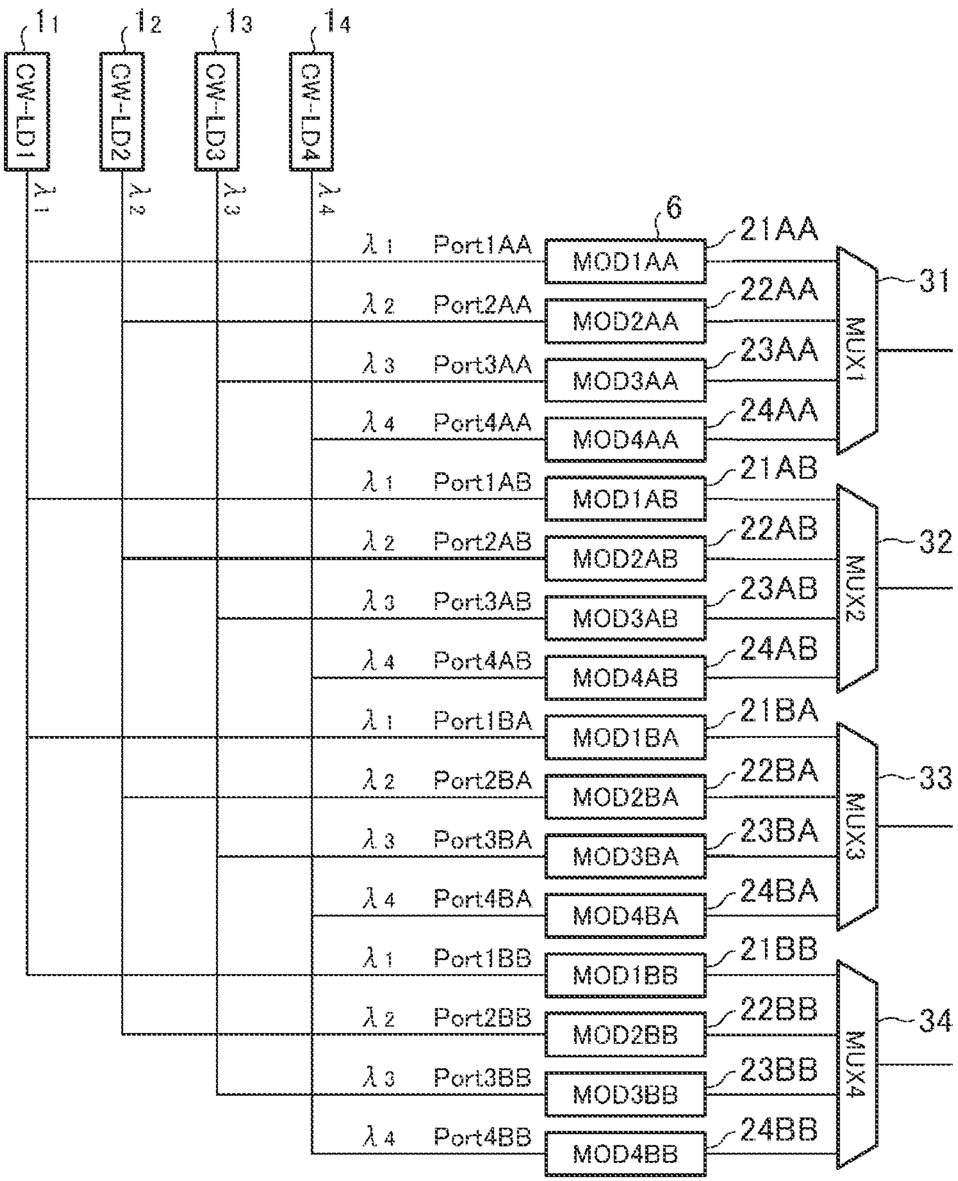
FIG. 5 is a figure depicting a configuration example of an optical transmitter according to a conventional technology.

For example, in a case of the configuration in FIG. 5 in which each of four wavelengths is split into four, that is, in a case of the configuration in which N=4 and M=4, the maximum number of waveguide crossings is (4–1)*4=12 since laser light with the wavelength $\lambda_4$ to be guided to the lane of Port4BB crosses each piece of other laser light with the wavelengths $\lambda_1$ to $\lambda_3$ at four stages.

On the other hand, in the case of the layout arrangement of the first embodiment, the maximum number of waveguide crossings at the j stages is N-1 per stage, and accordingly is expressed by Formula (2).

$$(N-1)*j=(N-1)*\log_2 M \tag{2}$$

For example, in a case where each of four wavelengths is split into four, $(4-1)*\log_2 4=6$ according to the configuration of the first embodiment. Accordingly, as compared with the conventional technology, the maximum number of waveguide crossings can be reduced to half.

Accordingly, assuming that insertion loss per waveguide crossing is IL (dB), waveguide crossing loss on a lane with the maximum number of waveguide crossings can be reduced by an amount expressed by Formula (3).

$$(N-1)*(M-\log_2 M)*IL[\text{dB}] \tag{3}$$

Accordingly, the optical transmitter according to the first embodiment can reduce inter-lane loss variation.

In addition, assuming that crosstalk per waveguide crossing is XT (dB), crosstalk on a lane with the maximum number of waveguide crossings can be reduced by an amount expressed by Formula (4).

$$(N-1)*(M-\log_2 M)*XT[\text{dB}] \tag{4}$$

That is, as compared with the conventional configuration, the output power of a laser light source can be reduced by an amount expressed by Formula (3), and the influence of crosstalk can be reduced by an amount expressed by Formula (4).

First Example

In the first embodiment mentioned above, the splitting rate of each lane when the splitting element 5 splits laser light into two lanes is not designated. However, for example, in FIG. 1, since the number of times of crossings with other lanes of a lane from the splitting element $\mathbf{5}_{11}$ to the splitting element $\mathbf{5}_{12}$ in one splitting block $\mathbf{50}_2$ and the number of times of crossings with other lanes of a lane from the splitting element 5*ii* to the splitting element $\mathbf{5}_{12}$ in the other splitting block $\mathbf{50}_2$ are different from each other, waveguide crossing loss of the former lane and latter lane is also different from each other. In addition, bend loss also differs depending on differences of the layout. In view of this, splitting rates are designated in a first example taking differences in the loss into consideration. Specifically, assuming that the splitting ratio of a splitting element 5 with an i-th (i: 1, 2, . . . , N) wavelength is $x_i$:1−$x_i$, the splitting rate $x_i$ ($0<x_i<1$) satisfies the following Formula 7. Note that ILx in Formula 7 is represented by the following Formula 8.

It is assumed here that $P_{ij}$ is the power to be input to an splitting element 5 with the i-th wavelength at the j-th stage. In addition, it is assumed that there are additional loss $IL_a$ (dB) of a lane with the splitting rate $x_i$, and additional loss $IL_b$ (dB) of a lane with the splitting rate $1-x_i$ as additional loss caused by waveguide loss or bend loss due to differences in the waveguide layout after passage through the splitting elements 5 at the first stage until the wavelength multiplexers 7, and the loss changes linearly.

$$P_{ij}*\{x_i*IL(\text{linear})^i+IL_a\}=P_{ij}*\{(1-x_i)*IL(\text{linear})^{N-1-i}+IL_b\} \tag{5}$$

$$\log x_i+i*\log IL(\text{linear})+\log IL_a(\text{linear})=\log(1-x_i)+(N-1-i)*\log(IL(\text{linear})+\log(IL_b(\text{linear})) \tag{6}$$

$$x_i=(IL_x(\text{linear})^{N-1-2i}/(1+IL_x(\text{linear})^{N-1-2i}) \tag{7}$$

$$IL_x(\text{linear})=(IL(\text{linear})*(IL_b(\text{linear}))/(IL_a(\text{linear})) \tag{8}$$

In this manner, the splitting rates of splitting elements are specified in such a manner that the splitting rate of continuous wave light to be split to a lane that crosses a greater number of lanes is higher than the splitting rate of continuous wave light to be split to a lane that crosses a smaller number of lanes. At least one splitting element in splitting elements used may have such splitting rates or all the splitting elements may have such splitting rates. By specifying the splitting ratios in such a manner that the splitting rates satisfy Formula (7), as compared with the case where the splitting ratios are equal, inter-lane power variation due to waveguide loss that differs depending on the numbers of waveguide crossings can be reduced, and a variation-reduction effect (splitting ratio variation-reduction effect) to an extent that is expressed by the following formula (9) is attained in addition to the waveguide crossing loss reduction effect expressed by Formula (3).

$$j*\{10*\log_{10}1/(2*(1-x_i)\}\ (\text{dB}) \tag{9}$$

Effects according to the present embodiment are illustrated by numerical computation. If it is assumed as a numerical computation example that the number of wavelengths N is 4, the number of splits M is 8, the waveguide crossing loss IL is 0.2 (dB) and, for simplification, there are no differences in waveguide loss other than those caused by waveguide crossings ($IL_a$=$IL_B$), it is possible to derive 0.466 as $x_i$. At this time, it can be known from Formula (9) that there is a variation-reduction effect of 0.869 (dB).

Figure 2:
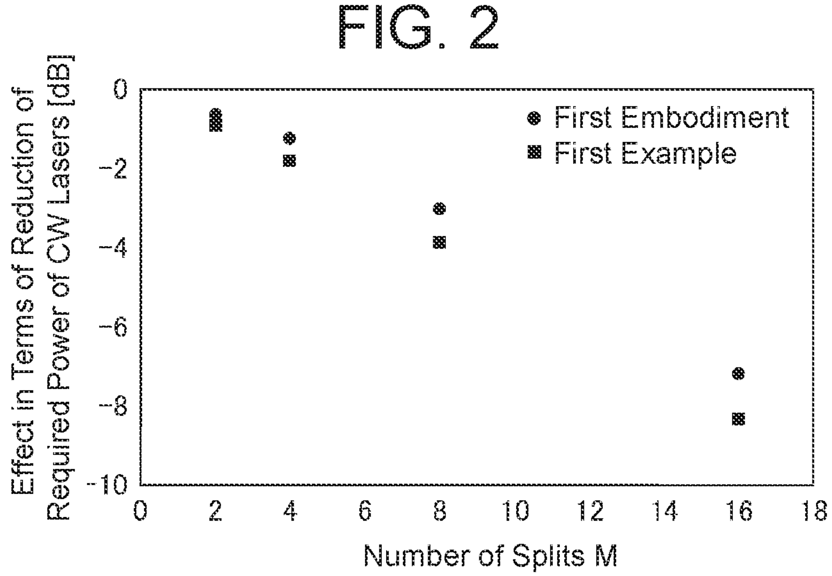
FIG. 2 is a figure for explaining effects of the optical transmitter according to the first embodiment and an optical transmitter according to a first example.

FIG. 2 depicts computation results of the effect of reduction of required CW laser power output of the first embodiment (the splitting ratios are 50:50) and the first example as compared with conventional configuration, where the number of wavelengths N is 4 and the number of splits M is represented by the horizontal axis. It can be known that as the number of splits M increases, the waveguide crossing loss reduction effect and the splitting ratio variation-reduction effect increase.

Since minimum output power and maximum output power are specified by standards for optical communication, output power of laser light sources need to be increased in such a manner that a lane that experiences the greatest waveguide loss satisfies the minimum output power of a standard, and additionally a lane that experiences the smallest waveguide loss needs to be within the maximum output power of the standard. As in the optical transmitter according to the first example, the numbers of waveguide crossings are minimized by optimizing the layout arrangement of split waveguides, and additionally inter-lane loss variation is reduced by adjusting the light splitting rates. Thereby, it becomes easier even for a multi-splitting optical transmitter to satisfy power specified by a standard.

Second Embodiment

<Configuration>

Figure 3A:
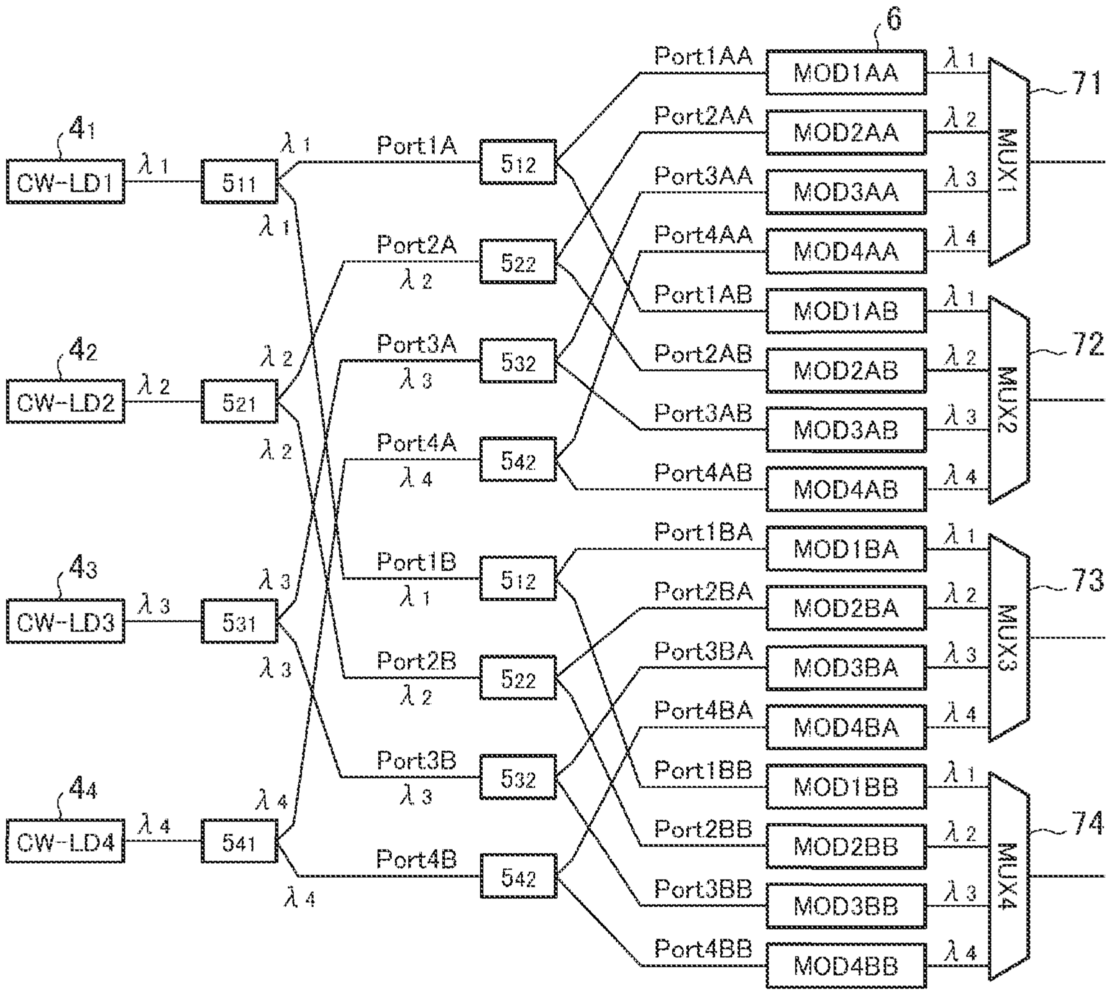
FIG. 3A is a figure depicting a configuration example of an optical transmitter portion of an optical transceiver according to a second embodiment.
Figure 3B:
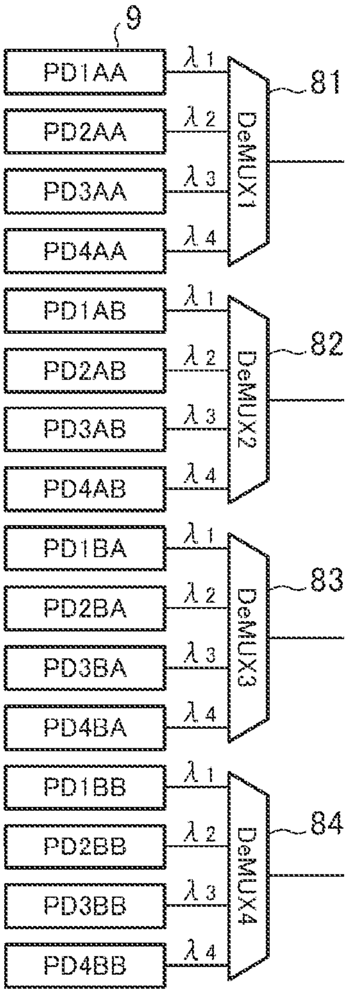
FIG. 3B is a figure depicting a configuration example of an optical receiver portion of the optical transceiver according to the second embodiment.

An optical transceiver using the optical transmitter according to the first embodiment or the first example is disclosed as a second embodiment. More specifically, the optical transceiver according to the second embodiment includes: the optical transmitter according to the first embodiment or the first example; and an optical receiver including: M wavelength demultiplexers to each demultiplex an input optical signal with N wavelengths into N signals each with a corresponding one of the N wavelengths; and N×M photodetectors to receive N×M demultiplexed signals. For example, configuration in a case where the number of wavelengths N is 4, and the number of splits M is 4 is depicted in FIG. 3A and FIG. 3B. FIG. 3A and FIG. 3B as a whole depict the configuration of the optical transceiver. FIG. 3A depicts the optical transmitter according to the first embodiment or the first example, and FIG. 3B depicts the optical receiver. As depicted in FIG. 3B, the optical transceiver includes four wavelength demultiplexers 81 to 84, and four photodetectors 9, each of which is optically connected to a corresponding one of the wavelength demultiplexers. The optical transmitter and the optical receiver may be integrated on one silicon photonics (Si photonics) chip or a platform formed by integrating different types of material on a Si photonics chip. Alternatively, the optical transmitter and the optical receiver may be integrated separately on separate chips.

(Wavelength Demultiplexers)

The wavelength demultiplexers (DeMUXs: demultiplexers) 81 to 84 are each an element to demultiplex an input optical signal with N wavelengths into N signals each with a corresponding one of the N wavelengths when the optical signal with the N wavelengths is input. As the wavelength demultiplexers 81 to 84, waveguide-type elements can be used, and, for example, arrayed waveguide diffraction gratings (AWGs), Echelle diffraction gratings, or light-demultiplexing elements in each of which a plurality of optical couplers are connected can be used. The wavelength demultiplexers 81 to 84 may be polarization-independent elements.

(Photodetectors)

The N×M photodetectors 9 are elements to convert received optical signals into electric signals. The electric signals may be amplified by Transimpedance Amplifiers (TIAs) which are not depicted.

<Operation>

Next, operation of the optical transceiver according to the second embodiment is explained. Optical signals transmitted by operation similar to that of the first embodiment or the first example from an optical transceiver configured similarly to the optical transceiver of the second embodiment are transferred via an optical fiber, and then enter the optical transceiver of the second embodiment. Each of the M optical signals having entered is wavelength-demultiplexed into N optical signals by a corresponding wavelength demultiplexer, and then the N×M optical signals are converted into electric signals by the N×M photodetectors.

By applying the present embodiment, it becomes possible to integrate the optical transceiver in a small size while reducing internal loss of the optical transmitter in parallel transfer using a plurality of single mode fibers.

Third Embodiment

<Configuration>

An optical transceiver using the optical transmitter according to the first embodiment or the first example is disclosed as a third embodiment. More specifically, the optical transceiver according to the third embodiment has configuration combining the optical transmitter according to the first embodiment or the first example, and an optical receiver explained below. The optical receiver includes: M polarization separation elements 10 to each polarization-separate an input optical signal with N wavelengths into TE-mode optical signals each with the N wavelengths and TM-mode optical signals each with the N wavelengths; M wavelength demultiplexers (811, 821, 831, 841) to receive input of the polarization-separated TE-mode optical signals each with the N wavelengths, and demultiplex the input optical signals into N signals each with a corresponding one of the N wavelengths; M polarization rotation elements 11 to receive input of the polarization-separated TM-mode optical signals each with the N wavelengths, and polarization-rotate each of the input optical signals by 90 degrees; M wavelength demultiplexers (812, 822, 832, 842) to demultiplex the optical signals that have been polarization-rotated by 90 degrees into N signals each with a corresponding one of the N wavelengths; and N×M×2 photodetectors ($\mathbf{9}_{TE}$, $\mathbf{9}_{TM}$) to receive the N×M×2 demultiplexed signals.

Figure 4A:
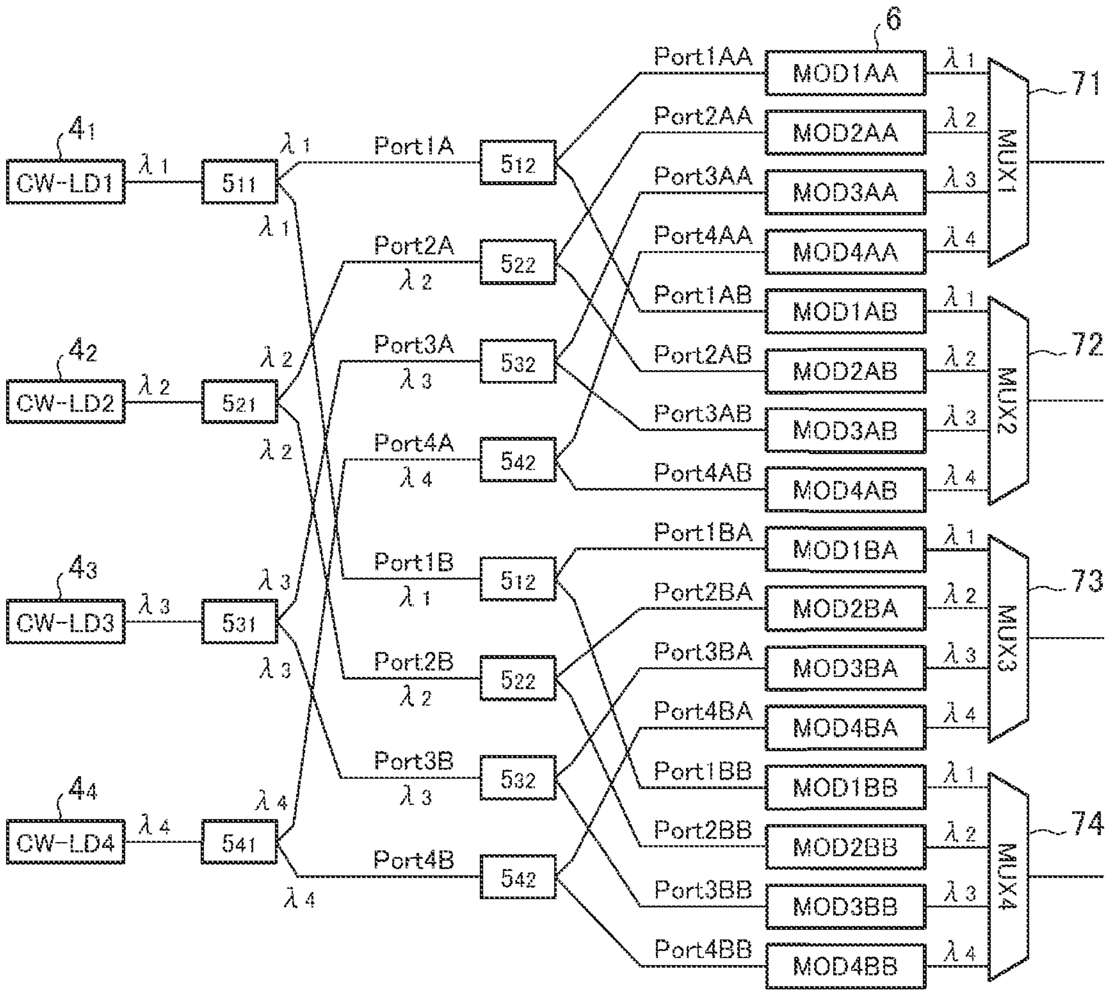
FIG. 4A is a figure depicting a configuration example of an optical transmitter portion of an optical transceiver according to a third embodiment.
Figure 4B:
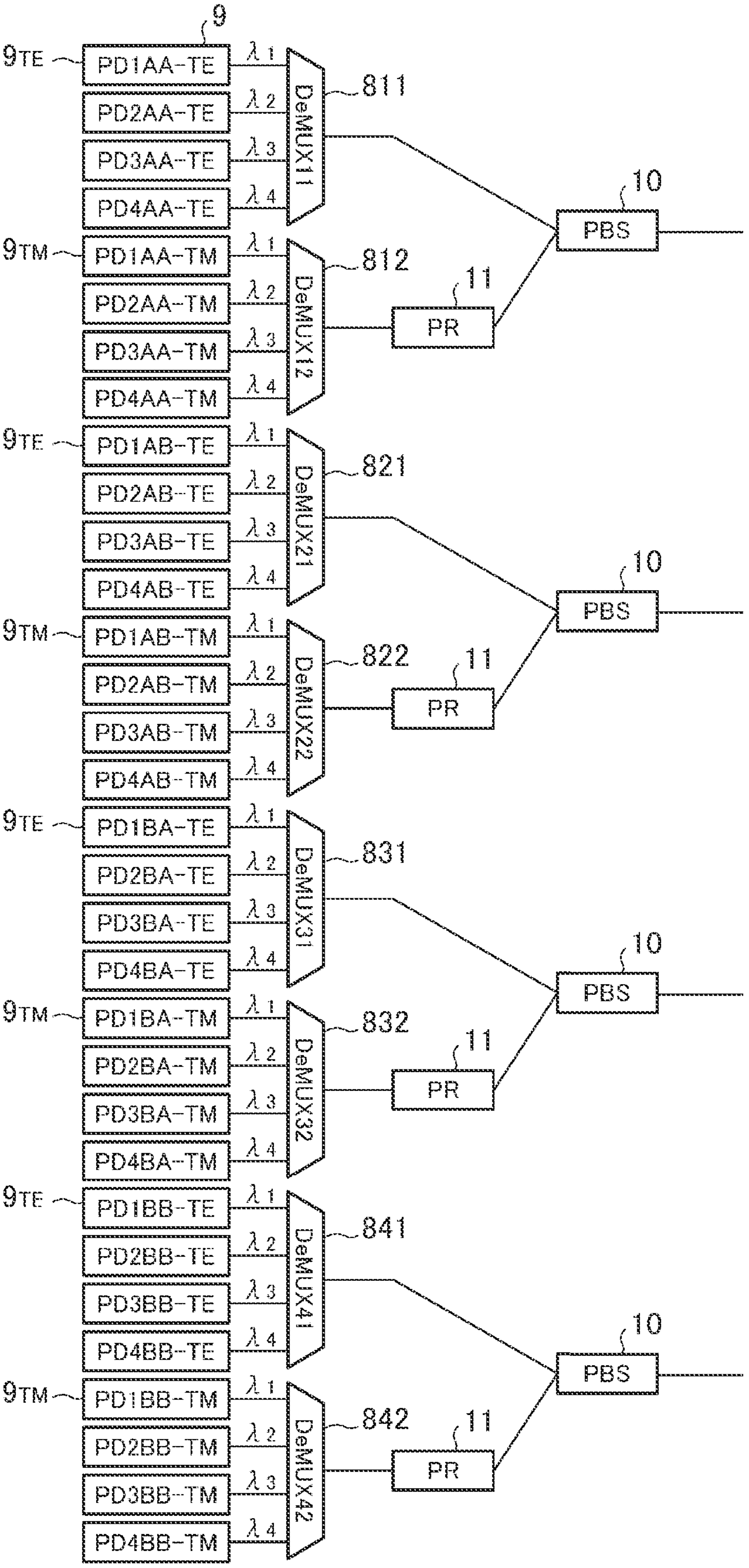
FIG. 4B is a figure depicting a configuration example of an optical receiver portion of the optical transceiver according to the third embodiment.

For example, configuration in a case where the number of wavelengths N is 4, and the number of splits M is 4 is depicted in FIG. 4A and FIG. 4B. FIG. 4A and FIG. 4B as a whole depict the configuration of the optical transceiver. FIG. 4A depicts the optical transmitter according to the first embodiment or the first example, and FIG. 4B depicts the optical receiver. As depicted in FIG. 4B, the optical transceiver includes: four polarization separation elements 10; four polarization rotation elements 11; eight wavelength demultiplexers 811 to 842; and four photodetectors 9TE or 9TM each connected to a corresponding one of the wavelength demultiplexers. The optical transmitter and the optical receiver may be integrated on one silicon photonics (Si photonics) chip or a platform formed by integrating different types of material on a Si photonics chip. Alternatively, the optical transmitter and the optical receiver may be integrated separately on separate chips.

(Polarization Separation Elements)

The polarization separation elements 10 are elements to separate entering light into TE-mode optical signals and TM-mode optical signals of a planar waveguide.

(Polarization Rotation Elements)

The polarization rotation elements 11 are elements to rotate the polarization of the input optical signals by 90 degrees.

The polarization separation elements and the polarization rotation elements can be formed as waveguide-type elements, and particularly may be formed of a Si photonics chip.

(Wavelength Demultiplexers)

The wavelength demultiplexers (DeMUXs: demultiplexers) 811 to 842 are each an element to demultiplex an input optical signal with N wavelengths into N signals each with a corresponding one of the N wavelengths when the optical signal with the N wavelengths is input. As the wavelength demultiplexers 811 to 842, waveguide-type elements can be used, and, for example, arrayed waveguide diffraction gratings (AWGs), Echelle diffraction gratings, or light-demultiplexing elements in each of which a plurality of optical couplers are connected can be used. Wavelength demultiplexers to operate in the TE mode can be used as the wavelength demultiplexers.

(Photodetectors)

The N×M×2 photodetectors 9 are elements to convert received optical signals into electric signals. The electric signals may be amplified by Transimpedance Amplifiers (TIAs) which are not depicted.

<Operation>

Next, operation of the optical transceiver according to the third embodiment is explained. Optical signals transmitted by operation similar to that of the first embodiment or the first example from an optical transceiver configured similarly to the optical transceiver of the third embodiment are transferred via an optical fiber, and then enter the optical transceiver of the third embodiment.

In a case where a planar waveguide system using a Si photonics chip is used, it becomes difficult to attain polarization-independence if manufacturing errors are taken into in consideration. Accordingly, in short-range communication that does not use polarization multiplexing using coherent detection, appropriate wavelength demultiplexing becomes impossible depending on the polarization states of received signals. In view of this, after the optical signals having entered are polarization-separated, the TM-mode optical signals after the separation are polarization-rotated by 90 degrees, and turn into TE-mode optical signals.

The polarization separation elements 10 polarization-separate the optical signals having entered. The separated TE-mode optical signals are transferred to the wavelength demultiplexers (811, 821, 831 or 841). The separated TM-mode optical signals are transferred to the polarization rotation elements 11. The polarization rotation elements 11 polarization-rotate the optical signals having entered, convert the optical signals into TE-mode optical signals, and transfer the optical signals having been converted into the TE-mode optical signals to the wavelength demultiplexers (812, 822, 832 or 842).

Each wavelength demultiplexer wavelength-demultiplexes an optical signal having entered into N signals. The N wavelength-demultiplexed signals are converted into electric signals by the N×M×2 photodetectors. After the conversion into the electric signals, the electric signals may be amplified by TIAs. After the conversion into the electric signals or after the amplification of the signals by the TIAs, two polarization-separated signal lanes (e.g. a signal having entered PD1AA-TE and a signal having entered PD1AA-TM) in the identical wavelength having entered from the same fiber are corrected in terms of phase difference, and then multiplexed.

By applying the present embodiment, it becomes possible to integrate the optical transceiver in a small size while reducing internal loss of the optical transmitter in parallel transfer using a plurality of single mode fibers. In addition, additional loss is less even in a case where TE-mode components of light having entered the optical receiver after single mode fiber transfer are weak. In addition, regarding the multiplexing of signals also, it becomes possible to more easily multiplex the signals after conversion into electric signals than in a case where delay lines are provided on optical waveguides, and the signals are multiplexed before the photodetectors, for example.

SUPPLEMENTARY NOTES

Several aspects of various embodiments explained above are summarized as follows.

Supplementary Note 1

An optical transmitter according to supplementary note 1 is an optical transmitter to split each of pieces of continuous wave light with N different wavelengths into M, where N is an integer equal to or greater than four, and M is an integer which is equal to or greater than two, and is a power of two, the optical transmitter including: a plurality of splitting elements (5) to each split input light into two, N of the plurality of splitting elements to which the pieces of continuous wave light with N different wavelength are input being included in each of splitting blocks arranged at $j=\log_2 M$ stages; N×M external modulators (6) to modulate respective pieces of the continuous wave light obtained by splitting at splitting elements at a j-th stage; and M wavelength multiplexers (7; 71 to 74) to multiplex every N different wavelengths of light after being modulated output from the external modulators, in which the plurality of splitting elements are connected in such a manner that arranging order of N wavelengths of N lanes that are input to an upstream splitting block and arranging order of N wavelengths of N lanes that are input to each of downstream splitting blocks are identical.

Supplementary Note 2

An optical transmitter according to supplementary note 2 is the optical transmitter according to supplementary note 1, in which at least one splitting element of the plurality of splitting elements has a higher splitting rate of continuous wave light to be split to a lane that crosses a greater number of lanes than a splitting rate of continuous wave light to be split to a lane that crosses a smaller number of lanes.

Supplementary Note 3

An optical transmitter according to supplementary note 3 is the optical transmitter according to supplementary note 1 or supplementary note 2, in which N splitting elements ($\mathbf{5}_{11}$ to $\mathbf{5}_{41}$) in a splitting block at a first stage in the splitting blocks at the j stages are connected with one or more semiconductor lasers (4) to generate the continuous wave light with N different wavelengths through N optical fibers.

Supplementary Note 4

An optical transmitter according to supplementary note 4 is the optical transmitter according to any one of supplementary notes 1 to 3, further including one or more semiconductor lasers (4) to generate the continuous wave light with N different wavelengths, in which the one or more semiconductor lasers, the plurality of splitting elements, the N×M external modulators and the M wavelength multiplexers are integrated on one silicon photonics chip on which different types of material are integrated.

Supplementary Note 5

An optical transmitter according to supplementary note 5 is the optical transmitter according to any one of supplementary notes 1 to 3, in which the plurality of splitting elements, the N×M external modulators and the M wavelength multiplexers are integrated on one silicon photonics chip or one silicon photonics chip on which different type of material are integrated.

Supplementary Note 6

An optical transmitter according to supplementary note 6 is the optical transmitter according to any one of supplementary notes 1 to 5, in which the plurality of splitting blocks are arranged in such a manner that the number of splitting blocks at an s-th stage is $2^{s-1}$ where s is an integer from 1 to j.

Supplementary Note 7

An optical transceiver according to supplementary note 7 is an optical transceiver including: the optical transmitter according to any one of supplementary notes 1 to 6; and an optical receiver including: M wavelength demultiplexers to each demultiplex an input optical signal with N wavelengths into N signals each with a corresponding one of the N wavelengths; and N×M photodetectors to receive N×M demultiplexed signals.

Supplementary Note 8

An optical transceiver according to supplementary note 8 is an optical transceiver including: the optical transmitter according to any one of supplementary notes 1 to 6; and an optical receiver including: M polarization separation elements (10) to each polarization-separate an input optical signal with N wavelengths into TE-mode optical signals each with the N wavelengths and TM-mode optical signals each with the N wavelengths; M wavelength demultiplexers (811, 821, 831, 841) to receive input of the polarization-separated TE-mode optical signals each with the N wavelengths, and demultiplex the input optical signals into N signals each with a corresponding one of the N wavelengths; M polarization rotation elements (11) to receive input of the polarization-separated TM-mode optical signals each with the N wavelengths, and polarization-rotate each of the input optical signals by 90 degrees; M wavelength demultiplexers (812, 822, 832, 842) to demultiplex the optical signals that have been polarization-rotated by 90 degrees into N signals each with a corresponding one of the N wavelengths; and N×M×2 photodetectors ($9_{TE}$, $9_{TM}$) to receive N×M×2 demultiplexed signals.

Supplementary Note 9

An optical transceiver according to supplementary note 9 is the optical transceiver according to supplementary note 7, in which the wavelength demultiplexers and the photodetectors are integrated on one silicon photonics chip.

Supplementary Note 10

An optical transceiver according to supplementary note 10 is the optical transceiver according to supplementary note 8, in which the wavelength demultiplexers, the polarization separation elements, the polarization rotation elements and the photodetectors are integrated on one silicon photonics chip.

Supplementary Note 11

An optical transceiver according to supplementary note 11 is the optical transceiver according to supplementary note 9 or 10, in which the optical transmitter and the optical receiver are integrated on one silicon photonics chip.

Note that it is possible to combine embodiments or to modify or omit each embodiment as appropriate.

INDUSTRIAL APPLICABILITY

The optical transmitter or optical transceiver of the present disclosure can be used as CPO to replace conventional pluggable transceivers.

REFERENCE SIGNS LIST

1 ($1_1$ to $1_4$): laser light source; 4 ($4_1$ to $4_4$): laser light source; 5 ($5_{11}$ to $5_{4j}$): splitting element; 6: external modulator; 7: wavelength multiplexer; 9 ($9_{TE}$, $9_{TM}$): photodetector; 10: polarization separation element; 11: polarization rotation element; 21AA to 24BB: external modulator; 31 to 34: wavelength multiplexer; 81 to 84: wavelength demultiplexer; 811: wavelength demultiplexer; 812: wavelength demultiplexer; 821: wavelength demultiplexer; 822: wavelength demultiplexer; 831: wavelength demultiplexer; 832: wavelength demultiplexer; 841: wavelength demultiplexer; 842: wavelength demultiplexer

The invention claimed is:

1. An optical transmitter to split individual continuous wave light signals with N different wavelengths into M signals, where N is an integer equal to or greater than four, and M is an integer which is greater than two, and is a power of two, the optical transmitter comprising:

a plurality of splitting elements arranged in a plurality of splitting blocks, each splitting block including N splitting elements configured to split an input light signal at one of the N different wavelengths into two signals, the plurality of splitting blocks being arranged in $j=\log_2 M$ stages;

N×M external modulators to modulate respective continuous wave light signals obtained via the plurality of splitting elements at a j-th stage of the $j=\log_2 M$ stages; and M wavelength multiplexers to multiplex N input light signals at different wavelengths output from the external modulators, wherein the plurality of splitting elements are connected in such a manner that an arranging order of N wavelengths of N lanes that are input to an upstream splitting block and an arranging order of N wavelengths of N lanes that are input to each of downstream splitting blocks are identical.

2. The optical transmitter according to claim 1, wherein at least one splitting element of the plurality of splitting elements has a higher splitting rate of continuous wave light to be split to a lane that crosses a greater number of lanes than a splitting rate of continuous wave light to be split to a lane that crosses a smaller number of lanes.

3. The optical transmitter according to claim 1, wherein the N splitting elements in a splitting block at a first stage in the splitting blocks at the j stages are connected with one or more semiconductor lasers to generate the continuous wave light with the N input light signals at the different wavelengths through N optical fibers.

4. The optical transmitter according to claim 1, further comprising:

one or more semiconductor lasers to generate the continuous wave light signals with the N input light signals at different wavelengths, wherein the one or more semiconductor lasers, the plurality of splitting elements, the N×M external modulators and the M wavelength multiplexers are integrated on one silicon photonics chip on which different types of material are integrated.

5. The optical transmitter according to claim 1, wherein the plurality of splitting elements, the N×M external modulators and the M wavelength multiplexers are integrated on one silicon photonics chip or one silicon photonics chip on which different type of material are integrated.

6. The optical transmitter according to claim 1, wherein the plurality of splitting blocks are arranged in such a manner that the number of the plurality of splitting blocks at an s-th stage is $2^{s-1}$ where s is an integer from 1 to j.

7. An optical transceiver comprising:

the optical transmitter according to claim 1; and an optical receiver including:

M wavelength demultiplexers to each demultiplex an input optical signal with N wavelengths into N signals each with a corresponding one of the N wavelengths; and N×M photodetectors to receive N×M demultiplexed signals.

8. The optical transceiver according to claim 7, wherein the M wavelength demultiplexers and the N×M photodetectors are integrated on one silicon photonics chip.

9. The optical transceiver according to claim 8, wherein the optical transmitter and the optical receiver are integrated on one silicon photonics chip.

10. An optical transceiver comprising:

the optical transmitter according to claim 1; and an optical receiver including:

M polarization separation elements to each polarization-separate an input optical signal with the N wavelengths into TE-mode optical signals each with the N wavelengths and TM-mode optical signals each with the N wavelengths;

M wavelength demultiplexers to receive input of the polarization-separated TE-mode optical signals each with the N wavelengths, and demultiplex the input optical signals into N signals each with a corresponding one of the N wavelengths;

M polarization rotation elements to receive input of the polarization-separated TM-mode optical signals each with the N wavelengths, and polarization-rotate each of the input optical signals by 90 degrees, wherein the M wavelength demultiplexers demultiplex the optical signals that have been polarization-rotated by 90 degrees into N signals each with a corresponding one of the N wavelengths; and the optical receiver further including:

N×M×2 photodetectors to receive N×M×2 demultiplexed signals.

11. The optical transceiver according to claim 10, wherein the M wavelength demultiplexers, the M polarization separation elements, the polarization rotation elements and the N×M×2 photodetectors are integrated on one silicon photonics chip.

12. The optical transceiver according to claim 11, wherein the optical transmitter and the optical receiver are integrated on one silicon photonics chip.

* * * * *